(12) United States Patent
Tang

(10) Patent No.: US 10,332,507 B2
(45) Date of Patent: Jun. 25, 2019

(54) METHOD AND DEVICE FOR WAKING UP VIA SPEECH BASED ON ARTIFICIAL INTELLIGENCE

(71) Applicant: BAIDU ONLINE NETWORK TECHNOLOGY (BEIJING) CO., LTD., Beijing (CN)

(72) Inventor: Liliang Tang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 160 days.

(21) Appl. No.: 15/624,312

(22) Filed: Jun. 15, 2017

(65) Prior Publication Data
US 2018/0158449 A1    Jun. 7, 2018

(30) Foreign Application Priority Data
Dec. 2, 2016    (CN) .......................... 2016 1 1111477

(51) Int. Cl.
| | |
|---|---|
| G10L 13/06 | (2013.01) |
| G10L 15/02 | (2006.01) |
| G10L 15/22 | (2006.01) |
| G10L 15/26 | (2006.01) |
| G10L 13/04 | (2013.01) |
| G10L 15/187 | (2013.01) |
| G10L 15/08 | (2006.01) |

(52) U.S. Cl.
CPC .............. *G10L 15/02* (2013.01); *G10L 13/04* (2013.01); *G10L 13/043* (2013.01); *G10L 15/083* (2013.01); *G10L 15/187* (2013.01); *G10L 15/22* (2013.01); *G10L 15/26* (2013.01); *G10L 15/08* (2013.01)

(58) Field of Classification Search
USPC ....................... 704/1–10, 230–257, 270–277
See application file for complete search history.

(56) References Cited

U.S. PATENT DOCUMENTS

| | | | | |
|---|---|---|---|---|
| 2001/0012994 A1* | 8/2001 | Komori | ................. | G10L 15/142 704/231 |
| 2013/0339028 A1* | 12/2013 | Rosner | ................. | G10L 15/222 704/275 |
| 2015/0095032 A1* | 4/2015 | Li | ........................... | G10L 15/08 704/255 |

* cited by examiner

*Primary Examiner* — Huyen X Vo
(74) *Attorney, Agent, or Firm* — Hodgson Russ LLP

(57) ABSTRACT

A method and a device for waking up via a speech based on artificial intelligence are provided in the present disclosure. The method includes: acquiring pronunciation information of a customized wake-up word; acquiring approximate pronunciation information of the pronunciation information; and constructing a network for identifying wake-up words according to a preset garbage word list, the pronunciation information and the approximate pronunciation information, identifying an input speech according to the network to acquire an identified result, and determining whether to perform a wake-up operation according to the identified result. With embodiments of the present disclosure, different networks for identifying the wake-up words may be constructed dynamically for different customized wake-up words, thus effectively improving an accuracy of waking up, reducing a false alarm rate, improving an efficiency of waking up, occupying less memory, and having low power consumption.

20 Claims, 6 Drawing Sheets

METHOD AND DEVICE FOR WAKING UP VIA SPEECH BASED ON ARTIFICIAL INTELLIGENCE

CROSS-REFERENCE TO RELATED APPLICATIONS

This application is based on and claims a priority to Chinese Patent Application Serial No. 201611111477.2, filed on Dec. 2, 2016, the entire content of which is incorporated herein by reference.

TECHNICAL FIELD

The present disclosure relates to the field of speech recognition technology, and more particularly, to a method and a device for waking up via a speech based on artificial intelligence.

BACKGROUND

Artificial intelligence (AI for short) is a new technical science studying and developing theories, methods, techniques and application systems for simulating, extending and expanding human intelligence. The artificial intelligence is a branch of computer science, which attempts to know the essence of intelligence and to produce an intelligent robot capable of acting as a human. The researches in this field include robots, speech recognition, image recognition, natural language processing and expert systems, etc.

A speech wake-up technology is an important branch of the speech recognition technology, plays an important role in applications (such as vehicles, navigations and smart home), and is configured to activate a program or a serve via a speech, so as to free hands.

SUMMARY

Embodiments of the present disclosure provide a method for waking up via a speech based on artificial intelligence. The method includes: acquiring pronunciation information of a customized wake-up word; acquiring approximate pronunciation information of the pronunciation information; and constructing a network for identifying wake-up words according to a preset garbage word list, the pronunciation information and the approximate pronunciation information, identifying an input speech according to the network to acquire an identified result, and determining whether to perform a wake-up operation according to the identified result.

Embodiments of the present disclosure provide an electronic device. The electronic device includes: a processor; a memory, configured to store instructions executable by the processor; in which, the processor is configured to: acquire pronunciation information of a customized wake-up word; acquire approximate pronunciation information of the pronunciation information; and construct a network for identifying wake-up words according to a preset garbage word list, the pronunciation information and the approximate pronunciation information, identify an input speech according to the network to acquire an identified result, and determine whether to perform a wake-up operation according to the identified result.

Embodiments of the present disclosure provide a non-transitory computer readable storage medium. When instructions stored in memory medium are executed by a processor of an electronic device, a method for waking up via a speech based on artificial intelligence may be executed by the electronic device. The method includes: acquiring pronunciation information of a customized wake-up word; acquiring approximate pronunciation information of the pronunciation information; and constructing a network for identifying wake-up words according to a preset garbage word list, the pronunciation information and the approximate pronunciation information, identifying an input speech according to the network to acquire an identified result, and determining whether to perform a wake-up operation according to the identified result.

Embodiments of the present disclosure provide a computer program product. When instructions in the computer program product are executed by a processor, a method for waking up via a speech is executed. The method includes: acquiring pronunciation information of a customized wake-up word; acquiring approximate pronunciation information of the pronunciation information; and constructing a network for identifying wake-up words according to a preset garbage word list, the pronunciation information and the approximate pronunciation information, identifying an input speech according to the network to acquire an identified result, and determining whether to perform a wake-up operation according to the identified result.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
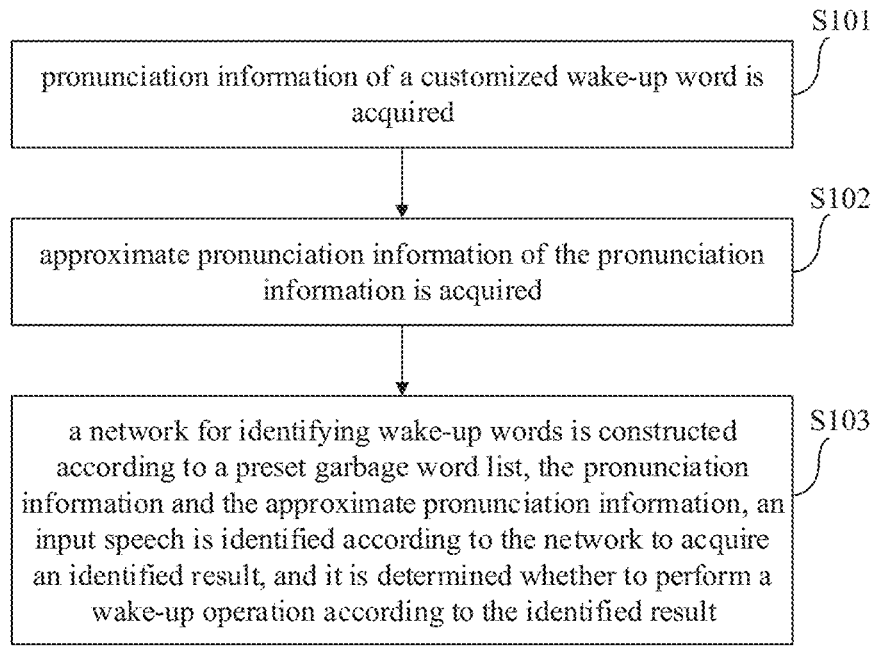
FIG. 1 is a flow chart illustrating a method for waking up via a speech based on artificial intelligence according to an embodiment of the present disclosure.

Embodiments of the present disclosure will be described in detail and examples of embodiments are illustrated in the drawings. The same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

In the description of the present disclosure, it is to be understood, terms such as "a plurality of" means two or more than two. Terms such as "first" and "second" are used herein for purposes of description and are not construed to indicate or imply relative importance or significance.

A method and a device for waking up via a speech based on artificial intelligence according to embodiments of the present disclosure will be described with reference to the drawings.

FIG. 1 is a flow chart illustrating a method for waking up via a speech based on artificial intelligence according to an embodiment of the present disclosure.

As illustrated in FIG. 1, the method includes followings.

At act S101, pronunciation information of a customized wake-up word is acquired.

The pronunciation information of the customized wake-up word is a structure including syllables of the customized wake-up word. Corresponding pronunciation information may be searched according to text input for corresponding to the customized wake-up word by a user. Alternatively, corresponding pronunciation information may be matched according to a speech input for corresponding to the customized wake-up word by the user.

For example, if the customized wake-up word defined by the user is "小度你好 (Chinese characters)", the corresponding pronunciation information is "xiao du ni hao (Chinese Pinyin)".

At act S102, approximate pronunciation information of the pronunciation information is acquired.

The approximate pronunciation information of the pronunciation information of the customized wake-up word may be a combination of pronunciation information of approximate syllables of respective syllables of the customized wake-up word.

In detail, a pre-established library of approximate pronunciations may be inquired according to each syllable in the pronunciation information of the customized wake-up word, so as to acquire approximate syllables having similar pronunciations to the syllables of the customized wake-up word to acquire the approximate pronunciation information.

For example, the syllable "jiao" has a similar pronunciation to the syllable "xiao", such that, in the library of approximate pronunciations, the syllable "jiao" is in a set Near_xiao of approximate pronunciations corresponding to the syllable "xiao".

Further, for each syllable in the pronunciation information of the customized wake-up word, the set of approximate pronunciations corresponding to each syllable may be searched to obtain the approximate pronunciation information of the pronunciation information of the customized wake-up word.

At act S103, a network for identifying wake-up words is constructed according to a preset garbage word list, the pronunciation information and the approximate pronunciation information, an input speech is identified according to the network to acquire an identified result, and it is determined whether to perform a wake-up operation according to the identified result.

The garbage word list may be created previously, and may be denoted as Garbage. In detail, a decoder may be obtained by parallel connecting all phones in a phone library. A large number of speeches are inputted into the decoder, then one or more output results with a maximum output times are selected from the output results to create the garbage word list.

Figure 2:
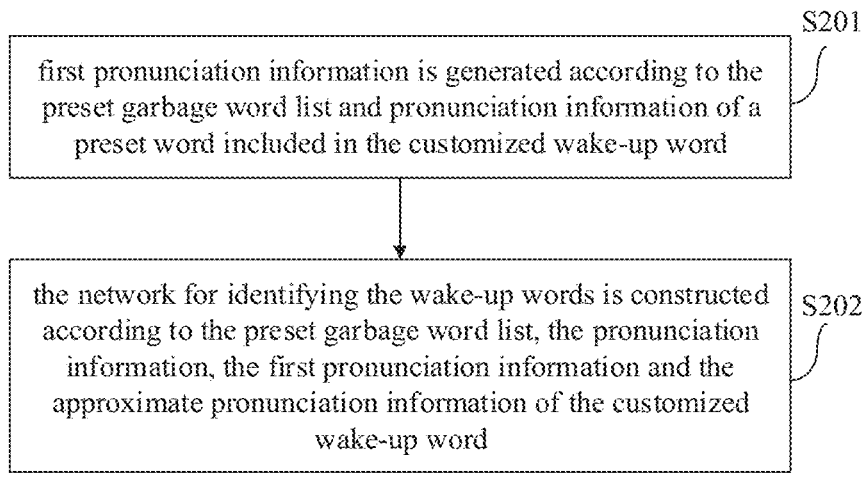
FIG. 2 is a flow chart illustrating a method for waking up via a speech based on artificial intelligence according to another embodiment of the present disclosure.

In an embodiment of the present disclosure, the network for identifying the wake-up words may be constructed by acts illustrated in FIG. 2. As illustrated in FIG. 2, acts from S201 to S202 are included.

At act S201, first pronunciation information is generated according to the preset garbage word list and pronunciation information of a preset word included in the customized wake-up word.

The preset word may be a word at a preset location of the customized wake-up word. For example, the preset word is a word located at head of the customized wake-up word, or at end of the customized wake-up word, which may be determined as need.

For example, in a case that the customized waking-up word is "小度你好", the preset word may be "小度" that is a word located at head of the customized wake-up word. The first pronunciation information "xiao du+Garbage" may be generated according to the pronunciation information "Xiao Du" of "小度" and the garbage word list.

At act S202, the network for identifying the wake-up words is constructed according to the preset garbage word list, the pronunciation information, the first pronunciation information and the approximate pronunciation information of the customized wake-up word.

For example, in a case that the customized wake-up word is "小度你好", the corresponding pronunciation information is "xiao du ni hao", and the corresponding approximate pronunciation information is "Near_xiao Near_du Near_ni Near_hao". The network for identifying the wake-up words illustrated as FIG. 3 may be obtained by parallel connecting the above corresponding pronunciation information, the above corresponding approximate pronunciation information, the garbage word list and the first pronunciation information "xiao du+Garbage".

Figure 3:
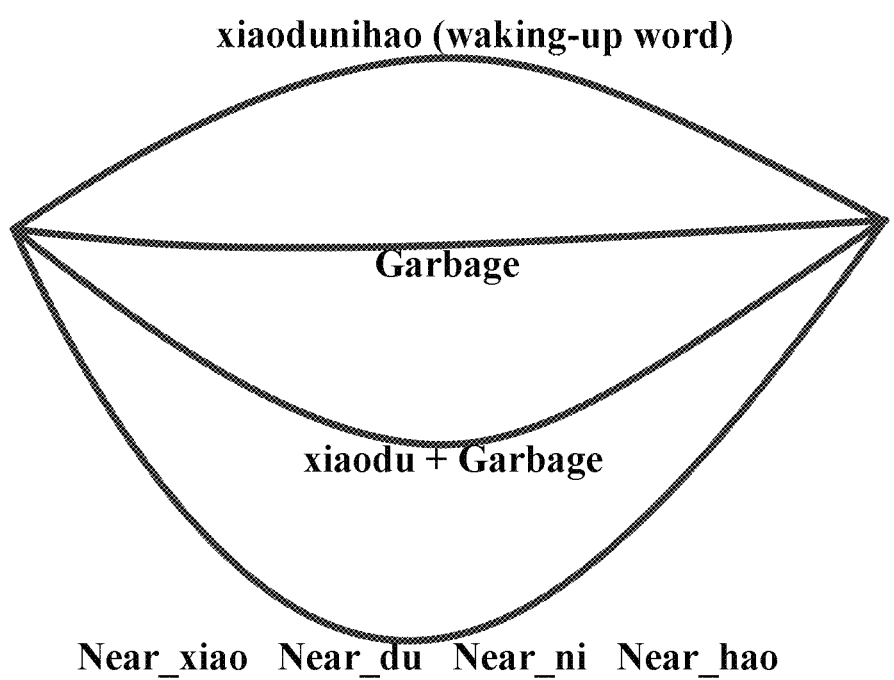
FIG. 3 is a schematic diagram illustrating a network for identifying wake-up words according to an embodiment of the present disclosure.

As illustrated in FIG. 3, the network for identifying the wake-up words is optimized for the customized wake-up word and is constructed automatically according to the customized wake-up word. Therefore, it needs no intervention and customization of technicians. As a result, an accuracy of waking up may be improved while a wake-up cost is reduced.

When the network for identifying the wake-up words according to embodiments of the present disclosure is constructed, by adding the approximate pronunciation information corresponding to the customized wake-up word, a system may still be waken up via an input speech with a pronunciation bias inputted by the user. For example, if the approximation pronunciation information "jiao du ni hao" of the pronunciation information "xiao du ni hao" of the customized wake-up word is inputted by the user, the approximate pronunciation information may be also regarded as the identified result for waking the system up, so as to perform the wake-up operation.

In addition, when the network for identifying the wake-up words according to embodiments of the present disclosure is constructed, the first pronunciation information created according to the garbage word list and the pronunciation information of the preset word in the customized wake-up word is added. Thus, the false alarm rate may be controlled according to paths formed by the first pronunciation information when the input speech inputted by the user is identified.

Furthermore, the speech inputted by the user may be identified according to the above network for identifying the wake-up words to obtain the identified result, and it is determined whether to perform the wake-up operation according to the identified result.

In detail, the input speech may be identified according to the above network for identifying the wake-up words by using any prior method to obtain the identified result, and it is determined whether to perform the wake-up operation according to the identified result. For example, acoustic features of the input speech are extracted, and the acoustic features are analyzed according to a preset acoustic model to obtain likelihood scores of a plurality of states. An optimum path is selected from the network for identifying the wake-up words as the identified result according to the likelihood scores and based on a Viterbi algorithm. A confidence of the identified result is calculated. The wake-up operation is performed if the confidence is greater than a first preset confidence; otherwise, the wake-up operation is not performed.

Figure 4:
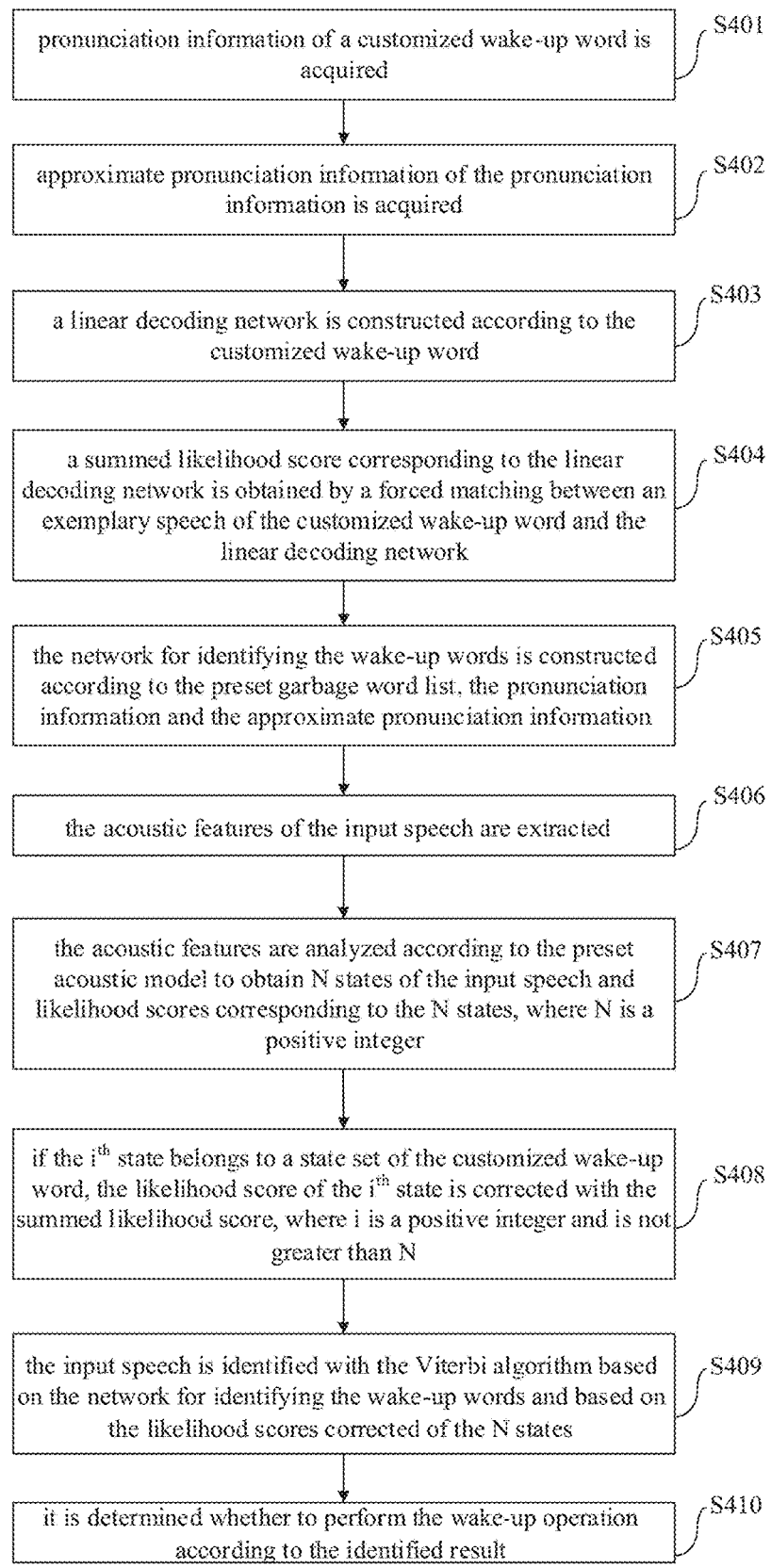
FIG. 4 is a flow chart illustrating a method for waking up via a speech based on artificial intelligence according to another embodiment of the present disclosure.
Figure 5:
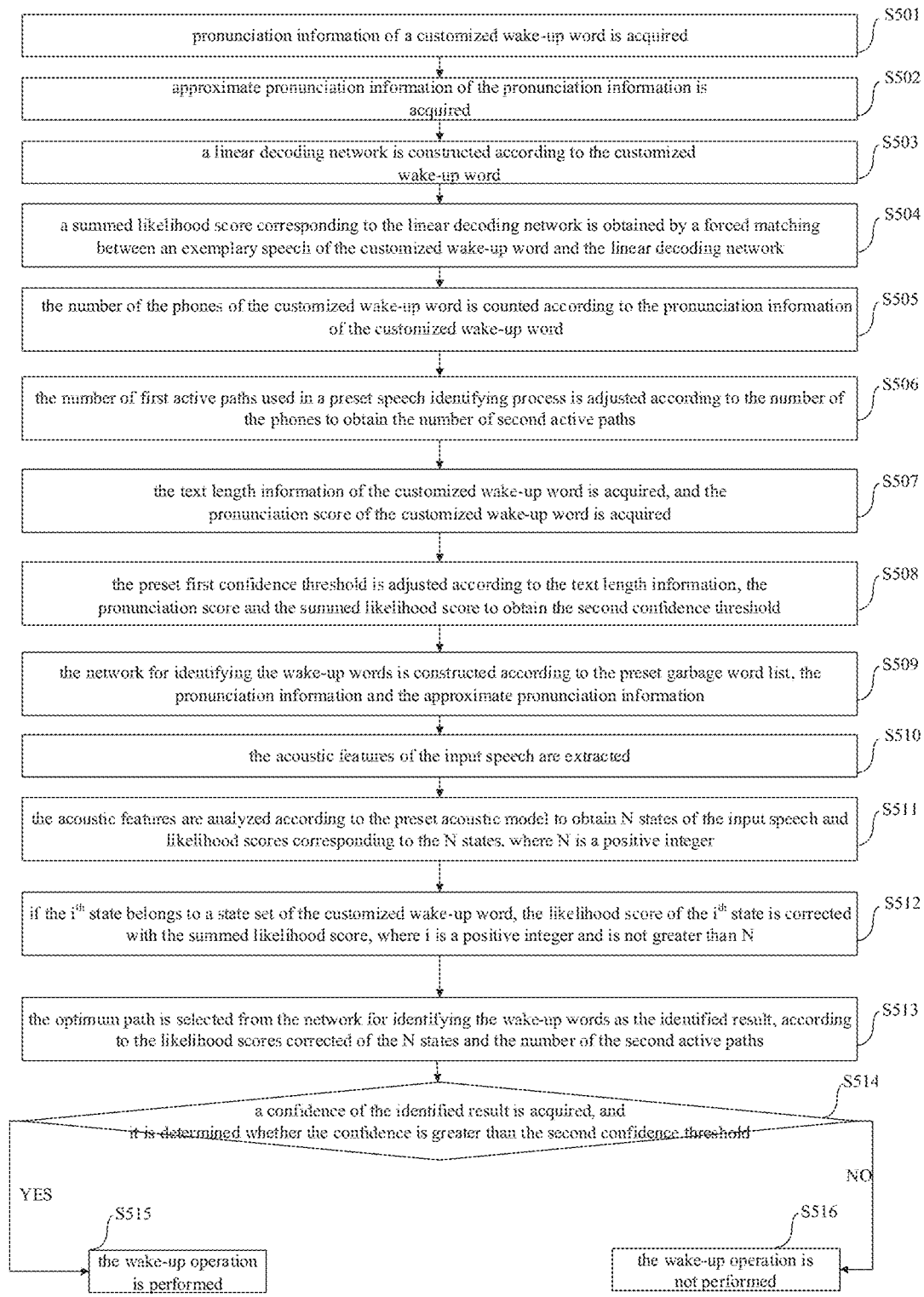
FIG. 5 is a flow chart illustrating a method for waking up via a speech based on artificial intelligence according to another embodiment of the present disclosure.

Alternatively, the input speech may be identified according to the above network for identifying the wake-up words by using a method to be described in following embodiments to obtain the identified result, and it is determined whether to perform the wake-up operation according to the identified result, which may be referred to embodiments illustrated in FIGS. 4-5 specifically.

With the method according to embodiments of the present disclosure, by acquiring the pronunciation information and the approximate pronunciation information of the customized wake-up word, and by constructing the network for identifying the wake-up words according to the preset garbage word list, the pronunciation information and the approximate pronunciation information, the input speech is identified according to the network to wake up, so that different networks for identifying the wake-up words may be constructed dynamically for different customized wake-up words and the wake-up operation is executed according to the identified result obtained by the different network for identifying the wake-up words. Compared with a conventional network for identifying the wake-up words, the network for identifying the wake-up words in the method according to embodiments of the present disclosure may effectively improve an accuracy of waking up. Furthermore, by adding the approximate pronunciation information when the network for identifying the wake-up words is constructed, the accuracy of waking up is further improved and a false alarm rate is reduced. In addition, the above-described process is fully automatic and does not need an intervention of human, thus having a low wake-up cost and a high speed of waking up, improving an efficiency of waking up and benefiting a popularity and an extension of the wake-up technology. Moreover, compared with a method for identifying and waking up by using a language model, the network for identifying the wake-up words with the garbage word list is used in embodiments of the present disclosure, instead of the language model, an occupation of a memory is reduced, meanwhile, an occupation of a hard-dish is therefore reduced. Such that the method may be used and optimized on a portable embedded device and may thus have low power consumption.

FIG. 4 is a flow chart illustrating a method for waking up via a speech based on artificial intelligence according to another embodiment of the present disclosure.

As illustrated in FIG. 4, the method includes following acts from S401 to S409.

The acts from S401 to S402 are identical to the acts from S101 to S102 described in embodiments of FIG. 1.

At act S403, a linear decoding network is constructed according to the customized wake-up word.

In detail, a preset state table may be inquired respectively according to respective phones of the customized wake-up word, to obtain a state corresponding to each phone and to generate a state information sequence corresponding to the customized wake-up word by combining the states of the phones. The linear decoding network is constructed according to the state information sequence.

For example, if the customized wake-up word defined by the user is "小度你好", the corresponding pronunciation information is "xiao du ni hao", thus the corresponding phones are "x i ao d u n i h ao". The state information sequence corresponding to the customized wake-up word may be obtained as S1, S2 . . . S27 by inquiring the preset state table. Then, the linear decoding network is constructed as si1, S1, S2 . . . S27, where si1 denotes a silent state.

At act S404, a summed likelihood score corresponding to the linear decoding network is obtained by a forced matching between an exemplary speech of the customized wake-up word and the linear decoding network.

The exemplary speech of the customized wake-up word is a standard speech of the customized wake-up word, which may be obtained by inquiring a preset speech database according to words included in the customized wake-up word.

In detail, the states corresponding to the exemplary speech are forcibly matched with the linear decoding network to obtain the likelihood scores of the respective states. The summed likelihood score may be calculated according to the likelihood scores of respective states, and may be denoted by SumFA.

At act S405, the network for identifying the wake-up words is constructed according to the preset garbage word list, the pronunciation information and the approximate pronunciation information.

The preset garbage word list may be created previously, and may be denoted by Garbage. In detail, a decoder may be formed by parallel connecting all phones in a phone library. A large amount of speeches are inputted into the decoder. One or more input results with a maximum output times are selected to generate the garbage word list.

In an embodiment of the present disclosure, the network for identifying the wake-up words may be constructed according to acts of FIG. 2.

Further, the input speech may be identified according to the above network for identifying the wake-up words to obtain the identified result, and it is determined whether to perform the wake-up operation according to the identified result.

It is to be illustrated that, in embodiments of the present disclosure, the act S405 may be executed ahead of the acts S403-S404, which is not limited by the present disclosure.

After the network for identifying the wake-up words is constructed according to the customized wake-up word defined by the user, the network may be loaded. Thus, when the input speech inputted by the user is received, the input speech may be identified according to the network for identifying the wake-up words as well as a preset acoustic model.

At act S406, the acoustic features of the input speech are extracted.

In detail, the input speech inputted by the user may be divided into frames, and the acoustic feature of each of the frames is extracted. The acoustic feature may be a 40-dimensional FilterBank feature or a 13-dimensional MFCC (Mel Frequency Cepstral Coefficient) feature.

At act S407, the acoustic features are analyzed according to the preset acoustic model to obtain N states of the input speech and likelihood scores corresponding to the N states, where N is a positive integer.

The acoustic model may be established previously. For example, the acoustic model may be a convolution neural network model, a deep neural network model or the like.

In detail, the acoustic features are formed into an acoustic feature vector. In an embodiment of the present disclosure, the acoustic feature vector may be multiplied to a matrix of the acoustic model to obtain a likelihood score vector including the likelihood scores of the states. Each component included in the likelihood score vector denotes the likelihood score of each state. For example, the likelihood score vector obtained includes $D_1, D_2 \ldots D_i \ldots D_N$, where $D_i$ denotes the likelihood score of an $i^{th}$ state.

At act S408, if the $i^{th}$ state belongs to a state set of the customized wake-up word, the likelihood score of the $i^{th}$ state is corrected with the summed likelihood score, where i is a positive integer and is not greater than N.

In detail, if the $i^{th}$ state belongs to the state set of the customized wake-up word, the likelihood score of the $i^{th}$ state may be corrected according to a formula of:

$$D_i'=D_i+\text{SumFA}/k1.$$

where, $D_i'$ denotes the corrected likelihood score of the $i^{th}$ state, $D_i$ denotes the likelihood score of the $i^{th}$ state that is not corrected. SumFA denotes the summed likelihood score of the linear decoding network corresponding to the customized wake-up word, and k1 is a preset first corrected parameter.

Accordingly, the likelihood score of the state which belongs to the state set of the customized wake-up word is corrected with the summed likelihood score of the linear decoding network corresponding to the customized wake-up word. Thus, it not only improves the likelihood score of the state, but also reduces an influence caused by a non-wake-up word. Therefore, it is a basis for obtaining a more accurate identified result in subsequent processes to improve an accuracy of waking up.

At act S409, the input speech is identified with the Viterbi algorithm based on the network for identifying the wake-up words and based on the likelihood scores corrected of the N states.

A process of identifying the input speech with the Viterbi algorithm based on the network for identifying the wake-up words is a process of selecting an optimal path from the network for identifying the wake-up words according to the corrected likelihood scores of the N states, in which the optimal path is used as the identified result.

Accordingly, it may be realized to identify the input speech according to the network for identifying the wake-up words via acts S406-S409.

At act S410, it is determined whether to perform the wake-up operation according to the identified result.

In an embodiment of the present disclosure, it is determined whether a confidence of the identified result is greater than a preset threshold. The wake-up operation is performed if the confidence is greater than the preset threshold; otherwise, the wake-up is not performed.

In another embodiment of the present disclosure; before the input speech inputted by the user is identified according to the network for identifying the wake-up words, the method may also include followings. Text length information of the customized wake-up word is acquired; and a pronunciation score of the customized wake-up word is acquired. A preset first confidence threshold is adjusted according to the text length information, the pronunciation score and the summed likelihood score, to obtain a second confidence threshold. And then, it is determined whether to perform the wake-up operation according to the second confidence threshold obtained by adjustment.

In detail, determining whether to perform the wake-up operation according to the identified result may include followings. A confidence of the identified result is acquired. And if the confidence is greater than the second confidence threshold, the wake-up operation is performed; otherwise, the wake-up operation is refused to be performed.

The pronunciation score of the customized wake-up word is obtained according to pronunciation scores of the syllables of the customized wake-up word, and the pronunciation scores of the syllables may be obtained by inquiring a pre-established probability distribution table of the wake-up words.

With the method according to embodiments of the present disclosure, by constructing the network for identifying the wake-up words according to the preset garbage word list, the pronunciation information and the approximate pronunciation information of the customized wake-up word, the input speech is identified according to the network to wake up, and the score of the acoustic model (i.e. the likelihood score of the state), which corresponds to the speech and is used in the identification process, may be corrected, thereby improving the accuracy of waking-up and reducing the false alarm rate. In addition, the above process is fully automated, without manual intervention, thereby reducing the wake-up cost, enhancing the wake-up speed, improving the efficiency of waking up and benefiting the popularity and extension of waking-up. In addition, relative to the method for identifying and waking up based on the language model, the network for identifying the wake-up words with the garbage word list is used in embodiments of the present disclosure, instead of the language model, the occupation of the memory is reduced, meanwhile, the occupation of the hard-dish is therefore reduced. Such that the method may be used and optimized on a portable embedded device and may thus have low power consumption.

FIG. 5 is a flow chart illustrating a method for waking up via a speech based on artificial intelligence according to another embodiment of the present disclosure. As illustrated in FIG. 5, the method includes following acts S501-S516.

As illustrated in FIG. 5, the acts S501-S504 are identical to the acts S401-S404 described in embodiments of FIG. 4, and the acts S509-S512 are identical to the acts S405-S408.

Further, before the input speech inputted by the user is identified according to the network for identifying the wake-up words, the method may further include following acts S505-S506.

At act S505, the number of the phones of the customized wake-up word is counted according to the pronunciation information of the customized wake-up word.

For example, in a case that the customized wake-up word defined by the user is " 小度你好 ", the corresponding pronunciation information is "xiao du ni hao". Thus, the corresponding number LengthPhone of the phones is 9 (i.e. x i ao d u n i h ao).

At act S506, the number of first active paths used in a preset speech identifying process is adjusted according to the number of the phones to obtain the number of second active paths.

In detail, the number of the first active paths may be adjusted by a formula of:

$$T=T+\text{LengthPhone}*k2$$

where, T' denotes the number of the second active paths, T denotes the number of the first active paths, LengthPhone denotes the number of the phones of the customized wake-up word, and k2 is a preset second corrected coefficient.

The number of the first active paths may be set as default. For example, the number of the first active paths is the number of the active paths used currently in a wake-up system or the number of initial active paths.

Accordingly, the number of the active paths used in a process of selecting the optimum path may be adjusted dynamically according to the number of the phones of the customized wake-up word. Compared to a method that the same number of the active paths are used for all wake-up words, the method in embodiments of the present disclosure may define different number of active paths for different customized wake-up words via a sample realization way, such that the wake-up operation is performed according to the identified result in a customized level. Furthermore, the accuracy of waking up and the efficiency of waking up may be effectively improved and a development difficulty and power consumption may be effectively reduced.

At act S507, the text length information of the customized wake-up word is acquired, and the pronunciation score of the customized wake-up word is acquired.

In embodiments of the present disclosure, the pronunciation scores of the respective syllables of the customized wake-up word are obtained by inquiring the pre-established probability distribution table.

For example, in a case that the customized wake-up word defined by the user is "小度你好", the text length information LengthTxt may be calculated to be 4. The corresponding pronunciation information of the 4 syllables is "xiao", "du", "ni" and "hao" respectively. The corresponding pronunciation score may be obtained respectively as WScore(xiao), WScore(du), WScore(ni), and WScore(hao), by inquiring the probability distribution table. The pronunciation score of the customized wake-up word is a summed value by adding the pronunciation scores of the respective pronunciation information up. That is, WScore=WScore(xiao)+WScore (du)+WScore(ni)+WScore(hao).

At act S508, the preset first confidence threshold is adjusted according to the text length information, the pronunciation score and the summed likelihood score to obtain the second confidence threshold.

In detail, the preset first confidence threshold may be adjusted to obtain the second confidence threshold according to a formula of:

ThresNew=ThresO+WScore*LengthTxt+SumFA/k3 where, ThresNew denotes the second confidence threshold, ThresO denotes the preset first confidence threshold, WScore denotes the pronunciation score of the customized wake-up word, LengthTxt denotes the text length information of the customized wake-up word, SumFA denotes the summed likelihood score of the linear decoding network of the customized wake-up word, and k3 is a preset third corrected coefficient.

Accordingly, the confidence threshold may be adjusted according to the text length information, the pronunciation score and the summed likelihood score corresponding to the customized wake-up word. Compared to the method that the same confidence threshold is used for all wake-up words, the different confidence thresholds are defined for different customized wake-up words via a sample realization way, such that the wake-up operation is performed according to the identified result in a customized level. Furthermore, the accuracy of waking up and the efficiency of waking up may be effectively improved and the development difficulty and the power consumption may be effectively reduced.

An occurred sequence of the acts S503-S504, the acts S505-S506, the acts S507-S508 and the act S509 is not limited and may be changed as need.

At act S513, the optimum path is selected from the network for identifying the wake-up words as the identified result, according to the likelihood corrected scores of the N states and the number of the second active paths.

At act S514, a confidence of the identified result is acquired.

It is to be illustrated that, the confidence of the identified result may be acquired via any one of alternative manners.

For example, a first average value of the scores of the acoustic features at all active nodes of the network for identifying the wake-up words may be calculated, and a second average value of the scores of the acoustic features at Y nodes, corresponding to the wake-up words, of the network for identifying the wake-up words, may be calculated. The confidence of the identified result is calculated according to the first average value and the second average value.

Alternatively, the confidence of the identified result may be calculated according to a preset model. The preset model may be a filler model. The filler model may cluster all speech information. That is, the filler model may contain the acoustic features of all speech information. In detail, the likelihood scores of the frames of the speech in the filler model may be calculated. And the scores of the frames in the acoustic model are subtracted by the respective likelihood scores of the respective frames to obtain differences. An average value may be calculated as the confidence according to the differences.

At act S515, the wake-up operation is performed if the confidence is greater than second confidence threshold.

At act S516, the wake-up operation is refused to be performed if the confidence is not greater than the second confidence threshold.

With the method according to embodiments of the present disclosure, by constructing the network for identifying the wake-up words according to the preset garbage word list, the pronunciation information and the approximate pronunciation information of the customized wake-up word, the input speech is identified according to the network to wake up, and the score of the acoustic model, the number of active paths and the confidence threshold, which all correspond to the speech and are used in the identification process, may be corrected, thereby improving the accuracy of waking-up and reducing the false alarm rate. In addition, the above process is fully automated, without manual intervention, thereby reducing the wake-up cost, enhancing the wake-up speed, improving the efficiency of waking up and benefiting the popularity and extension of waking-up. In addition, relative to the method for identifying and waking up based on the language model, the network for identifying the wake-up words with the garbage word list is used in embodiments of the present disclosure, instead of the language model, the occupation of the memory is reduced, meanwhile, the occupation of the hard-dish is therefore reduced. Such that the method may be used and optimized on a portable embedded device and may thus have low power consumption.

In an embodiment of the present disclosure, the probability distribution table for inquiring waking-up probability scores of the syllables in the act S507 described in embodiments of the FIG. 5 intends to count a success rate of waking up via the wake-up word, a false alarm rate and the like, so as to analyze whether the wake-up word is good or bad and to analyze the success rate of waking up. The probability distribution table may be constructed by acts illustrated in FIG. 6.

At act S601, for each syllable, a first number of characters having the pronunciation information including the each of the syllables respectively in a word library is counted, a second number of characters having the pronunciation information including the each syllables respectively in a preset set of text data is counted, and a third number of syllables of which pronunciation is similar to each syllable is counted.

Taking a Chinese character as an example for describing, the word library is a database including all Chinese characters. The preset set of text data may be a large amount of text data that is collected previously.

For example, in a case that the syllable is "xiao", the first number is the number of Chinese characters (such as "小", "笑", "晓", "校") having the pronunciation information that includes the syllable in the Chinese character library, and may be denoted by Cxiao. The second number is the number of the Chinese characters having the pronunciation information that includes the syllable in the large amount of text data, and may be denoted by Dxiao. The third number is the number of near syllables with similar pronunciations to the syllable "xiao" in all syllables, and may be denoted by Exiao.

In detail, when the number of near syllables of the syllable "xiao" is counted, state sequences corresponding to all syllables may be listed firstly. Difference degrees (denoted by Mxiao), between the all syllables and the syllable "xiao", is calculated according to the state sequences corresponding to the all syllables and the state sequence corresponding to the syllable "xiao". If the difference degree Mxiao of a syllable, between that syllable and the syllable "xiao" is smaller than a preset difference value, it may be determined that that syllable is the near syllable of the syllable "xiao". That is, that syllable has the similar pronunciation to the syllable "xiao". Thus, the number of syllables with the difference degree Mxiao smaller than the preset difference value may be counted, and may be denoted by the third number Exiao.

The difference degree may be represented by a quadratic sum of differences between the states of all syllables. For example, the state sequence corresponding to the syllable "xiao" is Sxiao1, Sxiao2 . . . , Sxiao9, and the state sequence corresponding to the syllable "hao" is Shao1, Shao2 . . . , Shao6, then the difference degree Mxiao between the syllable "hao" and the syllable "xiao" is:

$$Mxiao=(Sxiao1-Shao1)^2+(Sxiao2-Shao2)^2+ \ldots +(Sxiao6-Shao6)^2+(Sxiao7)^2+(Sxiao8)^2+(Sxiao9)^2$$

At act S602, a probability pronunciation score of the each of the syllables is calculated according to the first number, the second number and the third number, and the pre-established probability distribution table is established.

In detail, a weighted sum may be obtained according to the first number, the second number and the third number. That is, a weighted sum operation may be performed on the first number, the second number and the third number to obtain the probability pronunciation score of the each of the syllables in the wake-up word.

For example, the probability pronunciation score WScore (xiao) the syllable "xiao" may be calculated according to a formula of:

$$WScore(xiao)=h1*Cxiao+h2*Dxiao+h3*Exiao$$

where, h1, h2 and h3 are preset weighted values.

Thus, after the probability pronunciation score corresponding to each syllable is acquired, it is finished establishing the probability distribution table. The probability pronunciation score corresponding to a syllable may be found in the probability distribution table.

In order to achieve the above embodiments, a device for waking up via a speech based on artificial intelligence is also provided in embodiments of the present disclosure.

Figure 7:
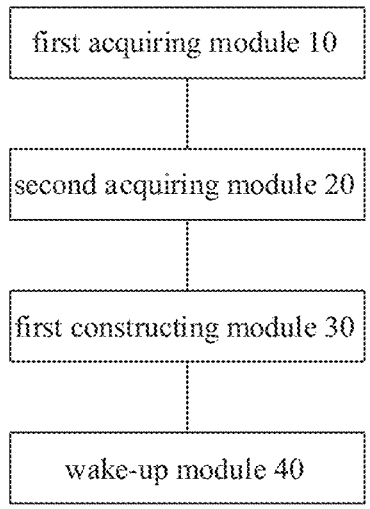
FIG. 7 is a block diagram illustrating a device for waking up via a speech based on artificial intelligence according to an embodiment of the present disclosure.

FIG. 7 is a block diagram illustrating a device for waking up via a speech based on artificial intelligence according to an embodiment of the present disclosure.

As illustrated in FIG. 7, the device includes: a first acquiring module 10, a second acquiring module 20, a first constructing module 30 and a wake-up module 40.

In detail, the first acquiring module 10 is configured to acquire pronunciation information of a customized wake-up word.

The pronunciation information of the customized wake-up word is a structure including syllables of the customized wake-up word. The first acquiring module 10 may be configured to search for corresponding pronunciation information according to text input for corresponding to the customized wake-up word by a user. Alternatively, first acquiring module 10 may be configured to match the corresponding pronunciation information according to a speech input for corresponding to the customized wake-up word by the user.

The second acquiring module 20 is configured to acquire approximate pronunciation information of the pronunciation information.

The approximate pronunciation information of the pronunciation information of the customized wake-up word may be a combination of pronunciation information of approximate syllables of respective syllables of the customized wake-up word.

In detail, the second acquiring module 20 may be configured to inquire a pre-established library of approximate pronunciations according to each syllable in the pronunciation information of the customized wake-up word, so as to acquire approximate syllables having similar pronunciations to the syllables of the customized wake-up word to acquire the approximate pronunciation information.

Further, for each syllable in the pronunciation information of the customized wake-up word, the set of approximate pronunciations corresponding to each syllable may be searched to obtain the approximate pronunciation information of the pronunciation information of the customized wake-up word.

The first constructing module 30 is configured to construct a network for identifying wake-up words according to a preset garbage word list, the pronunciation information and the approximate pronunciation information.

The garbage word list may be created previously, and may be denoted as Garbage. In detail, a decoder may be obtained by parallel connecting all phones in a phone library. A large number of speeches are inputted into the decoder, then one or more output results with a maximum output times are selected from the output results to create the garbage word list.

In an embodiment of the present disclosure, the first constructing module 30 is configured to generate first pronunciation information according to the preset garbage word list and pronunciation information of a preset word comprised in the customized wake-up word; and to construct the network for identifying the wake-up words according to the preset garbage word list, the pronunciation information, the first pronunciation information and the approximate pronunciation information of the customized wake-up word.

The preset word may be a word at a preset location of the customized wake-up word. For example, the preset word is a word located at head of the customized wake-up word, or at end of the customized wake-up word, which may be determined as need.

For example, in a case that the customized waking-up word is "小度你好", the preset word may be "小度" that is a word located at head of the customized wake-up word. The first pronunciation information "xiao du+Garbage" may be generated according to the pronunciation information of "Xiao Du" of "小度" and the garbage word list. In a case that the customized wake-up word is "小度你好", the corresponding pronunciation information is "xiao ni hao", and the corresponding approximate pronunciation information is "Near_xiao Near_du Near_ni Near_hao". The network for identifying the wake-up words illustrated as FIG. 3 may be obtained by parallel connecting the corresponding pronunciation information, the corresponding approximate pronunciation information, the garbage word list and the first pronunciation information "xiao du+Garbage".

As illustrated in FIG. 3, the network for identifying the wake-up words is optimized for the customized wake-up word and is constructed automatically according to the customized wake-up word. Therefore, it needs no intervention and customization of technicians. As a result, an accuracy of waking up may be improved while a wake-up cost is reduced.

When the network for identifying the wake-up words according to embodiments of the present disclosure is constructed, by adding the approximate pronunciation information corresponding to the customized wake-up word, a system may still be waken up via an input speech with a pronunciation bias inputted by the user. For example, if the approximation pronunciation information "jiao du ni hao" of the pronunciation information "xiao du ni hao" of the customized wake-up word is inputted by the user, the approximate pronunciation information may be also regarded as the identified result for waking the system up, so as to perform the wake-up operation.

In addition, when the network for identifying the wake-up words according to embodiments of the present disclosure is constructed, the first pronunciation information created according to the garbage word list and the pronunciation information of the preset word in the customized wake-up word is added. Thus, the false alarm rate may be controlled according to paths formed by the first pronunciation information when the input speech inputted by the user is identified.

Furthermore, the wake-up module 40 may be configured to identify the input speech inputted by the user according to the above network for identifying the wake-up words, to obtain the identified result, and to determine whether to perform the wake-up operation according to the identified result.

In detail, the wake-up module 40 may be configured to identify the input speech according to the above network for identifying the wake-up words by using any prior method to obtain the identified result, and to determine whether to perform the wake-up operation according to the identified result. For example, acoustic features of the input speech are extracted, and the acoustic features are analyzed according to a preset acoustic model to obtain likelihood scores of a plurality of states. An optimum path is selected from the network for identifying the wake-up words as the identified result according to the likelihood scores and based on a Viterbi algorithm. A confidence of the identified result is calculated. The wake-up operation is performed if the confidence is greater than a first preset confidence; otherwise, the wake-up operation is not performed.

Alternatively, the wake-up module 40 may be further configured to identify the input speech according to the above network for identifying the wake-up words by using a method to be described in following embodiments to obtain the identified result, and to determine whether to perform the wake-up operation according to the identified result.

With the device according to embodiments of the present disclosure, by acquiring the pronunciation information and the approximate pronunciation information of the customized wake-up word, and by constructing the network for identifying the wake-up words according to the preset garbage word list, the pronunciation information and the approximate pronunciation information, the input speech is identified according to the network to wake up, so that different networks for identifying the wake-up words may be constructed dynamically for different customized wake-up words and the wake-up operation is executed according to the identified result obtained by the different network for identifying the wake-up words. Compared with a conventional network for identifying the wake-up words, the network for identifying the wake-up words in the device according to embodiments of the present disclosure may effectively improve an accuracy of waking up. Furthermore, by adding the approximate pronunciation information when the network for identifying the wake-up words is constructed, the accuracy of waking up is further improved and a false alarm rate is reduced. In addition, the above-described process is fully automatic and does not need an intervention of human, thus having a low wake-up cost and a high speed of waking up, improving an efficiency of waking up and benefiting a popularity and an extension of the wake-up technology. Moreover, compared with a method for identifying and waking up by using a speech model, the network for identifying the wake-up words with the garbage word list is used in embodiments of the present disclosure, instead of the language model, an occupation of a memory is reduced, meanwhile, an occupation of a hard-dish is therefore reduced. Such that the device may be used and optimized on a portable embedded device and may thus have low power consumption.

Figure 8:
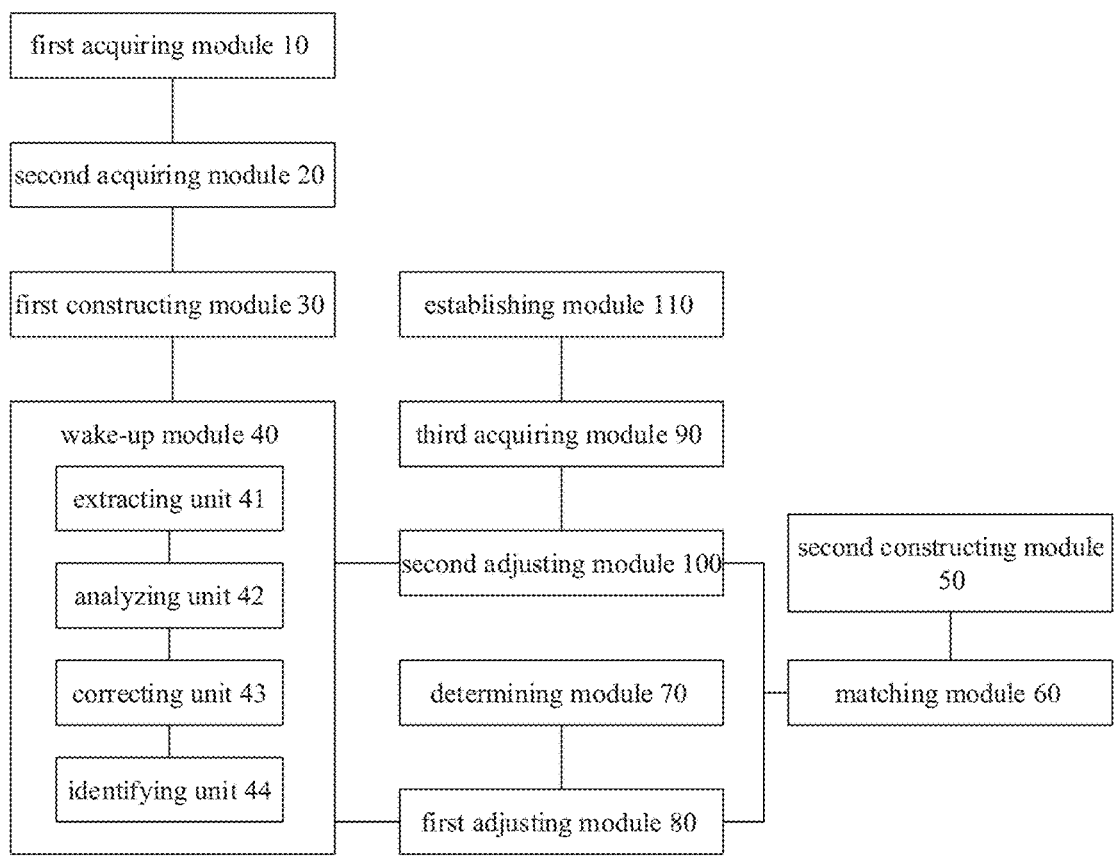
FIG. 8 is a block diagram illustrating a device for waking up via a speech based on artificial intelligence according to another embodiment of the present disclosure.

FIG. 8 is a block diagram illustrating a device for waking up via a speech based on artificial intelligence according to another embodiment of the present disclosure.

As illustrated in FIG. 8, the device includes a first acquiring module 10, a second acquiring module 20, a first constructing module 30, a wake-up module 40, a second constructing module 50, a matching module 60, a determining module 70, a first adjusting module 80, a third acquiring module 90, a second adjusting module 100 and an establishing module 110.

The first acquiring module 10, the second acquiring module 20, the first constructing module 30, and the wake-up module 40 are identical with those described in embodiments of FIG. 7.

The second constructing module 50 is configured to construct a linear decoding network according to the customized wake-up word.

In detail, the second constructing module 50 may be configured to inquire a preset state table according to respective phones of the customized wake-up word, to obtain a state corresponding to each phone and to generate a state information sequence corresponding to the customized wake-up word by combining the states of the phones. The linear decoding network is constructed according to the state information sequence.

The matching module 60 is configured to obtain a summed likelihood score of the linear decoding network by a forced matching between an exemplary speech of the customized wake-up word and the linear decoding network.

The exemplary speech of the customized wake-up word is a standard speech of the customized wake-up word, which may be obtained by inquiring a preset speech database according to words included in the customized wake-up word.

In detail, the matching module 60 may be configured to obtain the likelihood scores of the respective states by forcibly matching the states corresponding to the exemplary speech with the linear decoding network. The summed likelihood score may be calculated according to the likelihood scores of the respective states, and may be denoted by SumFA.

The determining module 70 is configured to determine the number of phones corresponding to the customized wake-up word according to the pronunciation information of the customized wake-up word.

The first adjusting module 80 is configured to adjust the number of first active paths used in a preset speech identifying process according to the number of the phones, to obtain the number of second active paths.

In detail, the number of the first active paths may be adjusted by a formula of:

$$T'=T+\text{LengthPhone}*k2$$

where, T' denotes the number of the second active paths, T denotes the number of the first active paths, LengthPhone denotes the number of the phones of the customized wake-up word, and k2 is a preset second corrected coefficient.

The number of the first active paths may be set as default. For example, the number of the first active paths is the number of the active paths used currently in a wake-up system or the number of initial active paths.

Accordingly, the number of the active paths used in a process of selecting the optimum path may be adjusted dynamically according to the number of the phones of the customized wake-up word. Compared to a method that the same number of the active paths are used for all wake-up words, the device in embodiments of the present disclosure may define different number of active paths for different customized wake-up words via a sample realization way, such that the wake-up operation is performed according to the identified result in a customized level. Furthermore, the accuracy of waking up and the efficiency of waking up may be effectively improved and a development difficulty and power consumption may be effectively reduced.

The third acquiring module 90 is configured to acquire text length information of the customized wake-up word and to acquire a pronunciation score of the customized wake-up word.

In embodiments of the present disclosure, the third acquiring module 90 may be configured to obtain the pronunciation scores of the respective syllables of the customized wake-up word by inquiring the pre-established probability distribution table.

The second adjusting module 100 is configured to adjust a preset first confidence threshold according to the text length information, the pronunciation score and the summed likelihood score, to obtain a second confidence threshold.

In detail, the preset first confidence threshold may be adjusted to obtain the second confidence threshold according to a formula of:

$$\text{ThresNew}=\text{ThresO}+\text{WScore}*\text{LengthTxt}+\text{SumFA}/k3$$

where, ThresNew denotes the second confidence threshold, ThresO denotes the preset first confidence threshold, WScore denotes the pronunciation score of the customized wake-up word, LengthTxt denotes the text length information of the customized wake-up word, SumFA denotes the summed likelihood score of the linear decoding network of the customized wake-up word, and k3 is a preset third corrected coefficient.

Accordingly, the confidence threshold may be adjusted according to the text length information, the pronunciation score and the summed likelihood score corresponding to the customized wake-up word. Compared to the method that the same confidence threshold is used for all wake-up words, the different confidence thresholds are defined for different customized wake-up words via a sample realization way, such that the wake-up operation is performed according to the identified result in a customized level. Furthermore, the accuracy of waking up and the efficiency of waking up may be effectively improved and the development difficulty and the power consumption may be effectively reduced.

The wake-up module 40 further includes: an extracting unit 41, an analyzing unit 42, a correcting unit 43 and an identifying unit 44.

The extracting unit 41 is configured to extract acoustic features of the input speech.

In detail, the extracting unit 41 may be configured to divide the input speech inputted by the user into frames, and to extract the acoustic feature of each of the frames. The acoustic feature may be a 40-dimensional FilterBank feature or a 13-dimensional MFCC (Mel Frequency Cepstral Coefficient) feature.

The analyzing unit 42 is configured to analyze the acoustic features according to a preset acoustic model to obtain N states of the input speech and likelihood scores of the N states, wherein N is a positive integer.

The acoustic model may be established previously. For example, the acoustic model may be a convolution neural network model, a deep neural network model or the like.

In detail, the acoustic features are formed into an acoustic feature vector. In an embodiment of the present disclosure, the acoustic feature vector may be multiplied to a matrix of the acoustic model to obtain a likelihood score vector including the likelihood scores of the states. Each component included in the likelihood score vector denotes the likelihood score of each state. For example, the likelihood score vector obtained includes $D_1, D_2 \ldots D_i \ldots D_N$, where $D_i$ denotes the likelihood score of an $i^{th}$ state.

The correcting unit 43 is configured to correct a likelihood score of an $i^{th}$ state with the summed likelihood score if the $i^{th}$ state belongs to a state set of the customized wake-up word, where i is a positive integer and not greater than N.

In detail, if the $i^{th}$ state belongs to the state set of the customized wake-up word, the likelihood score of the $i^{th}$ state may be corrected according to a formula of:

$$D_i'=D_i+\text{SumFA}/k1$$

where, $D_i'$ denotes the corrected likelihood score of the $i^{th}$ state, $D_i$ denotes the likelihood score of the $i^{th}$ state that is not corrected, Sun/FA denotes the summed likelihood score of the linear decoding network corresponding to the customized wake-up word, and k1 is a preset first corrected parameter.

Accordingly, the likelihood score of the state which belongs to the state set of the customized wake-up word is corrected with the summed likelihood score of the linear decoding network corresponding to the customized wake-up word. Thus, it not only improves the likelihood score of the state, but also reduces an influence caused by a non-wake-up word. Therefore, it is a basis for obtaining a more accurate identified result in subsequent processes to improve an accuracy of waking up.

The identifying unit 44 is configured to identify the input speech by using a Viterbi algorithm based on the network and according to the likelihood scores of N states corrected.

A process of identifying the input speech with the Viterbi algorithm based on the network for identifying the wake-up words is a process of selecting an optimum path from the network for identifying the wake-up words according to the likelihood scores corrected of the N states, and determining the optimum path as the identified result.

In an embodiment of the present disclosure, the identifying unit 44 is configured to select the optimum path from the network for identifying the wake-up words as the identified result according to the likelihood scores corrected of the N states and the number of the second active paths.

Then, the wake-up module 40 is configured to determine whether to perform the wake-up operation according to the identified result. In detail, the wake-up module 40 is configured to: acquire a confidence of the identified result; perform the wake-up operation if the confidence is greater than the second confidence threshold; and refuse to perform the wake-up operation if the confidence is not greater than the second confidence threshold.

It is to be illustrated that, the confidence of the identified result may be acquired by via any one of alternative manners.

For example, a first average value of the scores of the acoustic features at all active nodes of the network for identifying the wake-up words may be calculated, and a second average value of the scores of the acoustic features at Y nodes, corresponding to the wake-up words, of the network for identifying the wake-up words, may be calculated. The confidence of the identified result is calculated according to the first average value and the second average value.

Alternatively, the confidence of the identified result may be calculated according to a preset model. The preset model may be a filler model. The filler model may cluster all speech information. That is, the filler model may contain the acoustic features of all speech information. In detail, the likelihood scores of the frames of the speech in the filler model may be calculated. And the scores of the frames in the acoustic model are subtracted by the respective likelihood scores of the respective frames to obtain differences. An average value may be calculated as the confidence according to the differences.

In an embodiment of the present disclosure, the probability distribution table of waking-up probability scores of the syllables acquired by the third acquiring module 90 intends to count a success rate of waking up via the wake-up words, a false alarm rate and the like. Thus, it may be analyzed whether the wake-up word is good or bad and the success rate of waking up may be analyzed. The probability distribution table may be constructed via the establishing module 110.

The establishing module 110 is configured to establish the pre-established probability distribution table by followings. For each of the syllables, a first number of characters having the pronunciation information including the each of the syllables respectively is counted in a word library, a second number of characters having the pronunciation information including the each of the syllables respectively is counted in a preset set of text data, and a third number of syllables of which pronunciation is similar to that of the each of the syllables is counted. And for each of the syllables, a probability pronunciation score of the each of the syllables is calculated according to the first number, the second number and the third number, and the pre-established probability distribution table is established.

Figure 6:
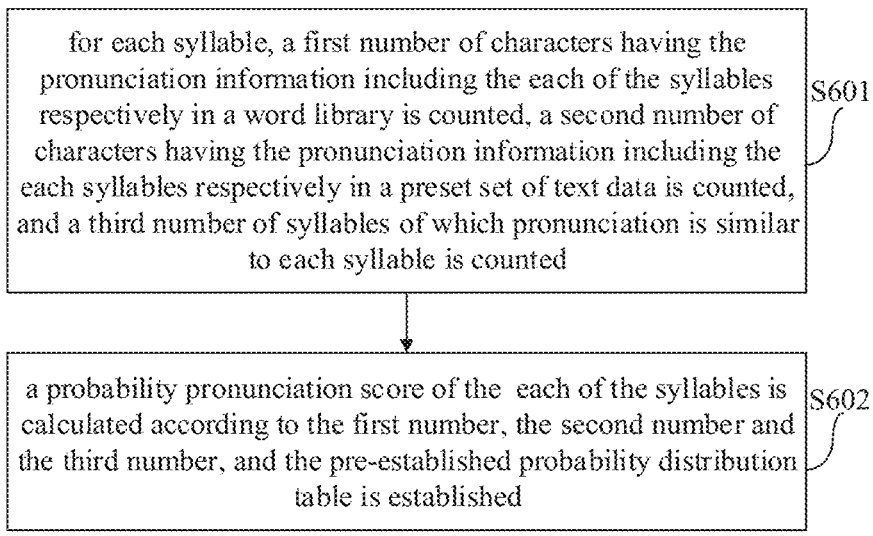
FIG. 6 is a flow chart illustrating a method for waking up via a speech based on artificial intelligence according to another embodiment of the present disclosure.

In detail, the device may be implemented with reference to embodiments of FIG. 6.

With the device according to embodiments of the present disclosure, by constructing the network for identifying the wake-up words according to the preset garbage word list, the pronunciation information and the approximate pronunciation information of the customized wake-up word, the input speech is identified according to the network to wake up, and the score of the acoustic model, the number of active paths and the confidence threshold, which all correspond to the speech and are used in the identification process, may be corrected, thereby improving the accuracy of waking-up and reducing the false alarm rate. In addition, the above process is fully automated, without manual intervention, thereby reducing the wake-up cost, enhancing the wake-up speed, improving the efficiency of waking up and benefiting the popularity and extension of waking-up. In addition, relative to the method for identifying and waking up based on the language model, the network for identifying the wake-up words with the garbage word list is used in embodiments of the present disclosure, instead of the language model, the occupation of the memory is reduced, meanwhile, the occupation of the hard-dish is therefore reduced. Such that the device may be used and optimized on a portable embedded device and may thus have low power consumption.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

Although explanatory embodiments have been shown and described, it would be appreciated by those skilled in the art that the above embodiments are exemplary and cannot be construed to limit the present disclosure, and changes, alternatives, and modifications can be made in the embodiments by those skilled in the art without departing from scope of the present disclosure.

What is claimed is:

1. A method for waking up via a speech based on artificial intelligence, comprising:

acquiring, by at least one computing device, pronunciation information of a customized wake-up word;

acquiring, by the at least one computing device, approximate pronunciation information of the pronunciation information;

constructing, by the at least one computing device, a network for identifying wake-up words according to a preset garbage word list, the pronunciation information and the approximate pronunciation information;

identifying, by the at least one computing device, an input speech according to the network to acquire an identified result; and determining, by the at least one computing device, whether to perform a wake-up operation according to the identified result.

2. The method according to claim 1, wherein constructing, by the at least one computing device, a network for identifying wake-up words according to a preset garbage word list, the pronunciation information and the approximate pronunciation information comprises:

generating, by the at least one computing device, first pronunciation information according to the preset garbage word list and pronunciation information of a preset word comprised in the customized wake-up word; and constructing, by the at least one computing device, the network for identifying the wake-up words according to the preset garbage word list, the pronunciation information, the first pronunciation information and the approximate pronunciation information of the customized wake-up word.

3. The method according to claim 1, wherein before identifying an input speech according to the network, the method further comprises:

constructing, by the at least one computing device, a linear decoding network according to the customized wake-up word; and obtaining, by the at least one computing device, a summed likelihood score of the linear decoding network by a forced matching between an exemplary speech of the customized wake-up word and the linear decoding network; and wherein identifying, by at least one computing device, an input speech according to the network comprises:

extracting, by the at least one computing device, acoustic features of the input speech;

analyzing, by the at least one computing device, the acoustic features according to a preset acoustic model to obtain N states of the input speech and likelihood scores of the N states, wherein N is a positive integer;

correcting, by the at least one computing device, a likelihood score of an $i^{th}$ state with the summed likelihood score if the $i^{th}$ state belongs to a state set of the customized wake-up word, wherein i is a positive integer and not greater than N; and identifying, by the at least one computing device, the input speech by using a Viterbi algorithm based on the network and according to the likelihood scores of N states corrected.

4. The method according to claim 3, wherein before identifying an input speech according to the network, the method further comprises:

determining, by the at least one computing device, the number of phones corresponding to the customized wake-up word according to the pronunciation information of the customized wake-up word;

adjusting, by the at least one computing device, the number of first active paths used in a preset speech identifying process according to the number of the phones, to obtain the number of second active paths; and wherein identifying, by the at least one computing device, the input speech by using a Viterbi algorithm based on the network and according to the likelihood scores of N states corrected comprises:

selecting, by the at least one computing device, an optimum identifying path from the network according to the likelihood scores of N states corrected and the number of the second active paths, to obtain the identified result of the input speech.

5. The method according to claim 3, wherein before identifying an input speech according to the network, the method further comprises:

acquiring, by the at least one computing device, text length information of the customized wake-up word;

acquiring, by the at least one computing device, a pronunciation score of the customized wake-up word; and adjusting, by the at least one computing device, a preset first confidence threshold according to the text length information, the pronunciation score and the summed likelihood score, to obtain a second confidence threshold; and wherein determining, by the at least one computing device, whether to perform a wake-up operation according to the identified result comprises:

acquiring, by the at least one computing device, a confidence of the identified result;

performing, by the at least one computing device, the wake-up operation if the confidence is greater than the second confidence threshold; and refusing, by the at least one computing device, to perform the wake-up operation if the confidence is not greater than the second confidence threshold.

6. The method according to claim 5, wherein acquiring, by the at least one computing device, a pronunciation score of the customized wake-up word comprises:

inquiring, by the at least one computing device, a pre-established probability distribution table of the wake-up words to obtain pronunciation scores of respective syllables of the customized wake-up word.

7. The method according to claim 6, wherein the pre-established probability distribution table of the wake-up words is established by:

for each of the syllables, counting, by the at least one computing device, a first number of characters having the pronunciation information comprising the each of the syllables respectively in a word library, counting, by the at least one computing device, a second number of characters having the pronunciation information comprising the each of the syllables respectively in a preset set of text data, and counting, by the at least one computing device, a third number of syllables of which pronunciation is similar to the each of the syllables; and for each of the syllables, calculating, by the at least one computing device, a probability pronunciation score of the each of the syllables according to the first number, the second number and the third number, and establishing, by the at least one computing device, the pre-established probability distribution table.

8. An electronic device comprising:
a processor;
a memory, configured to store instructions executable by the processor; wherein the processor is configured to:

acquire pronunciation information of a customized wake-up word;
acquire approximate pronunciation information of the pronunciation information;
construct a network for identifying wake-up words according to a preset garbage word list, the pronunciation information and the approximate pronunciation information;
identify an input speech according to the network to acquire an identified result; and
determine whether to perform a wake-up operation according to the identified result.

9. The electronic device according to claim 8, wherein the processor is configured to construct a network for identifying wake-up words according to a preset garbage word list, the pronunciation information and the approximate pronunciation information by acts of:
generating first pronunciation information according to the preset garbage word list and pronunciation information of a preset word comprised in the customized wake-up word; and
constructing the network for identifying the wake-up words according to the preset garbage word list, the pronunciation information, the first pronunciation information and the approximate pronunciation information of the customized wake-up word.

10. The electronic device according to claim 8, wherein the processor is further configured to:
construct a linear decoding network according to the customized wake-up word; and
obtain a summed likelihood score of the linear decoding network by a forced matching between an exemplary speech of the customized wake-up word and the linear decoding network; and
the processor is configured to identify an input speech according to the network by acts of:
extracting acoustic features of the input speech;
analyzing the acoustic features according to a preset acoustic model to obtain N states of the input speech and likelihood scores of the N states, wherein N is a positive integer;
correcting a likelihood score of an $i^{th}$ state with the summed likelihood score if the $i^{th}$ state belongs to a state set of the customized wake-up word, wherein i is a positive integer and not greater than N; and
identifying the input speech by using a Viterbi algorithm based on the network and according to the likelihood scores of N states corrected.

11. The electronic device according to claim 10, wherein the processor is further configured to:
determine the number of phones corresponding to the customized wake-up word according to the pronunciation information of the customized wake-up word;
adjust the number of first active paths used in a preset speech identifying process according to the number of the phones, to obtain the number of second active paths; and
the processor is configured to identify the input speech by using a Viterbi algorithm based on the network and according to the likelihood scores of N states corrected by acts of:
selecting an optimum identifying path from the network according to the likelihood scores of N states corrected and the number of the second active paths, to obtain the identified result of the input speech.

12. The electronic device according to claim 10, wherein the processor is further configured to:

acquire text length information of the customized wake-up word and acquire a pronunciation score of the customized wake-up word; and
adjust a preset first confidence threshold according to the text length information, the pronunciation score and the summed likelihood score, to obtain a second confidence threshold; and
the processor is configured to: determine whether to perform a wake-up operation according to the identified result by acts of:
acquiring a confidence of the identified result;
performing the wake-up operation if the confidence is greater than the second confidence threshold; and
refusing to perform the wake-up operation if the confidence is not greater than the second confidence threshold.

13. The electronic device according to claim 12, wherein the processor is configured to acquire a pronunciation score of the customized wake-up word by acts of:
inquiring a pre-established probability distribution table of the wake-up words to obtain pronunciation scores of respective syllables of the customized wake-up word.

14. A non-transitory computer readable storage medium comprising instructions, wherein when the instructions are executed by a processor of a device to perform acts of:
acquiring pronunciation information of a customized wake-up word;
acquiring approximate pronunciation information of the pronunciation information; and
constructing a network for identifying wake-up words according to a preset garbage word list, the pronunciation information and the approximate pronunciation information, identifying an input speech according to the network to acquire an identified result, and determining whether to perform a wake-up operation according to the identified result.

15. The non-transitory computer readable storage medium according to claim 14, wherein constructing a network for identifying wake-up words according to a preset garbage word list, the pronunciation information and the approximate pronunciation information comprises:
generating first pronunciation information according to the preset garbage word list and pronunciation information of a preset word comprised in the customized wake-up word; and
constructing the network for identifying the wake-up words according to the preset garbage word list, the pronunciation information, the first pronunciation information and the approximate pronunciation information of the customized wake-up word.

16. The non-transitory computer readable storage medium according to claim 14, wherein when the instructions are executed by a processor of a server to further perform acts of:
constructing a linear decoding network according to the customized wake-up word; and
obtaining a summed likelihood score of the linear decoding network by a forced matching between an exemplary speech of the customized wake-up word and the linear decoding network; and
wherein identifying an input speech according to the network comprises:
extracting acoustic features of the input speech;
analyzing the acoustic features according to a preset acoustic model to obtain N states of the input speech and likelihood scores of the N states, wherein N is a positive integer;

correcting a likelihood score of an $i^{th}$ state with the summed likelihood score if the $i^{th}$ state belongs to a state set of the customized wake-up word, wherein i is a positive integer and not greater than N; and identifying the input speech by using a Viterbi algorithm based on the network and according to the likelihood scores of N states corrected.

17. The non-transitory computer readable storage medium according to claim 16, wherein when the instructions are executed by a processor of a server to further perform acts of:

determining the number of phones corresponding to the customized wake-up word according to the pronunciation information of the customized wake-up word;

adjusting the number of first active paths used in a preset speech identifying process according to the number of the phones, to obtain the number of second active paths; and wherein identifying the input speech by using a Viterbi algorithm based on the network and according to the likelihood scores of N states corrected comprises:

selecting an optimum identifying path from the network according to the likelihood scores of N states corrected and the number of the second active paths, to obtain the identified result of the input speech.

18. The non-transitory computer readable storage medium according to claim 16, wherein before identifying an input speech according to the network, the method further comprises:

acquiring text length information of the customized wake-up word and acquiring a pronunciation score of the customized wake-up word; and adjusting a preset first confidence threshold according to the text length information, the pronunciation score and the summed likelihood score, to obtain a second confidence threshold; and wherein determining whether to perform a wake-up operation according to the identified result comprises:
acquiring a confidence of the identified result;
performing the wake-up operation if the confidence is greater than the second confidence threshold; and
refusing to perform the wake-up operation if the confidence is not greater than the second confidence threshold.

19. The non-transitory computer readable storage medium according to claim 18, wherein acquiring a pronunciation score of the customized wake-up word comprises:

inquiring a pre-established probability distribution table of the wake-up words to obtain pronunciation scores of respective syllables of the customized wake-up word.

20. The non-transitory computer readable storage medium according to claim 19, wherein the pre-established probability distribution table of the wake-up words is established by:

for each of the syllables, counting a first number of characters having the pronunciation information comprising the each of the syllables respectively in a word library, counting a second number of characters having the pronunciation information comprising the each of the syllables respectively in a preset set of text data, and counting a third number of syllables of which pronunciation is similar to the each of the syllables; and for each of the syllables, calculating a probability pronunciation score of the each of the syllables according to the first number, the second number and the third number, and establishing the pre-established probability distribution table.

* * * * *